(12) United States Patent
Cocks et al.

(10) Patent No.: US 8,141,086 B2
(45) Date of Patent: Mar. 20, 2012

(54) USING DATA IN ELEMENTS OF A SINGLY LINKED LIST WITHOUT A LOCK IN A MULTITHREADED ENVIRONMENT

(75) Inventors: Martin William John Cocks, Hampshire (GB); Felicity Jane Merrison, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 12/134,288

(22) Filed: Jun. 6, 2008

(65) Prior Publication Data

US 2009/0307694 A1     Dec. 10, 2009

(51) Int. Cl.
    G06F 9/46      (2006.01)
    G06F 12/00     (2006.01)
(52) U.S. Cl. .................................. 718/102; 710/200
(58) Field of Classification Search .................. None
    See application file for complete search history.

(56) References Cited

U.S. PATENT DOCUMENTS

| | | | |
|---|---|---|---|
| 6,067,547 A * | 5/2000 | Douceur | 1/1 |
| 6,581,063 B1 * | 6/2003 | Kirkman | 1/1 |
| 6,615,216 B1 | 9/2003 | Hu | |
| 6,988,180 B2 | 1/2006 | Kadatch | |
| 2006/0005191 A1 | 1/2006 | Boehm | |

OTHER PUBLICATIONS

Shalev et al.; Split-Ordered Lists—Lock-free Resizable Hash Tables; a preliminary version of this paper appeared in the Proceedings of the Twenty-second Annual ACM Symposium on Principles of Distributed Computing, pp. 102-111, Boston, Massachusetts (2003); 25 pages.
Sundell et al.; Fast and Lock-Free Concurrent Priority Queues for Multi-Thread Systems; Technical Report No. 2001-01; Department of Computing Science, Chalmers University of Technology and Göteborg University, SE-412 96 Göteborg, Sweden (2003); 15 pages.

* cited by examiner

*Primary Examiner* — Jennifer To
*Assistant Examiner* — Eric Wai
(74) *Attorney, Agent, or Firm* — Schmeiser, Olsen & Watts; Richard M. Kotulak

(57) ABSTRACT

A method and system for validating a scan of a chain in a multithreaded environment. A modification counter and an anchor address are atomically copied from the chain's header into a first variable (browse counter) and second variable, respectively. The second variable is set to a next address stored in a current element of the chain. The next address references a next element of the chain. The browse counter is incremented. If the browse counter is greater than a current value of the modification counter (M.Counter) and if the second variable includes a valid address, then the scan is valid up to the current element, the scan continues with the next element as the current element, and the process repeats starting with setting the second variable to the next address. Otherwise, if the browse counter is less than or equal to M.Counter, then the scan is invalid.

19 Claims, 9 Drawing Sheets

_500_

```
         LM    R8,R9,16(R6)   POINT TO CHAIN
         LTR   R8,R8          IS IT ZEROS
         BZ    TRACEIT        NOTHING ON THE FREE CHAIN
         LR    R4,R8          TAKE A COPY
         SRL   R4,24          JUST KEEP TOP BYTE
         C     R4,=F'240'     IS IT AN INVALID ADDRESS
         BNL   DUMPIT         YES - WE HAVE A PROBLEM
CHKCHAIN DS    0H
         L     R8,0(R8)       NEXT IN CHAIN
         LA    R9,1(R9)       INCREMENT OUR LOCAL COUNT
         C     R9,20(R6)      COMPARE AGAINST ACTUAL
         BNH   TRACEIT        LOCAL COUNT IS NOT GREATER
         LTR   R8,R8          IS IT ZEROS
         BZ    TRACEIT        YES - END OF FREE CHAIN
         LR    R4,R8          TAKE A COPY
         SRL   R4,24          JUST KEEP TOP BYTE
         C     R4,=F'240'     IS IT AN INVALID ADDRESS
         BNL   DUMPIT         YES - WE HAVE A PROBLEM
         B     CHKCHAIN       CHECK NEXT ONE
...
TRACEIT - Exit or rescan
DUMPIT - Validation error found, produce system diagnostics
```

FIG. 5

USING DATA IN ELEMENTS OF A SINGLY LINKED LIST WITHOUT A LOCK IN A MULTITHREADED ENVIRONMENT

FIELD OF THE INVENTION

The present invention relates to a data processing method and system for using data in elements of a singly linked list without a lock in a multithreaded environment and more particularly to a technique for verifying a scan of an unused element chain without a lock in a multithreaded environment.

BACKGROUND OF THE INVENTION

For product serviceability, code is invoked periodically to monitor and validate control blocks within a dynamic system. In scenarios in which all operations are single threaded, control structures such as chains (i.e., singly linked lists) can be scanned and validated without the need of a lock. For example, in an IBM® MVS™ system, all changes can be made on a single task control block (TCB). The aforementioned scanning and validating approach is no longer possible when the control blocks are updated concurrently (e.g., in an MVS system using multiple TCBs). The ability to scan chains with integrity is essential for serviceability, but obtaining lock on a chain negatively affects both the performance and timing of task interactions, thereby making it difficult to reproduce a problem that causes a corrupted chain. Thus, there exists a need to overcome at least one of the preceding deficiencies and limitations of the related art.

SUMMARY OF THE INVENTION

In a first embodiment, the present invention provides a computer-implemented method for validating a scan of an unused element chain (hereinafter referred to simply as the chain) in a multithreaded computing environment. A first thread and a second thread are executed by a computing system in the multithreaded computing environment. The computing system performs the following steps in the first thread. A modification counter and an anchor address are atomically copied from a header of the chain into a first variable and a second variable, respectively. The atomic copying includes initially setting a browse counter in the first variable to the modification counter. Subsequent to atomically copying the modification counter and the anchor address, the second variable is set to a next address stored in a current element of the chain. The next address references a next element of the chain. The current element is initially a first element of the chain. The first element of the chain is referenced by the anchor address. Subsequent to atomically copying the modification counter and the anchor address, the browse counter stored in the first variable is incremented to indicate an advance of the scan. Subsequent to setting the second variable to the next address and subsequent to incrementing the browse counter, the computing system determines that the browse counter is greater than a current value of the modification counter. The current value of the modification counter indicates any modification made to the chain in the second thread. In response to determining that the browse counter is greater than the current value of the modification counter, the computing system determines that the scan of the chain is valid up to the next element of the chain. For each element of the chain that has a valid next address, the steps of setting the second variable to the next address, incrementing the browse counter, and determining that the browse counter is greater than the current value of the modification counter are iterated until the scan of the chain is completed. Upon completing the scan, an indication of a result of the scan is stored in a computer data storage unit. In response to completing the scan while the browse counter is greater than the current value of the modification counter, the scan is identified as being a valid scan having no invalid addresses.

In a second embodiment, the present invention provides a computer-implemented method for detecting an invalid scan of an unused element chain in a multithreaded computing environment. A first thread and a second thread are executed by a computing system in the multithreaded computing environment. The computing system performs the following steps in the first thread. A modification counter and an anchor address are atomically copied from a header of the chain into a first variable and a second variable, respectively. The atomic copying includes initially setting a browse counter in the first variable to the modification counter. The anchor address references a first element of a plurality of elements included in the chain. A current element of the chain is initially set as the first element of the chain. The current element includes a next address that references a next element of the chain. Subsequent to atomically copying the modification counter and anchor address, the computing system determines that the anchor address in the second variable is valid based on a predefined criterion. Subsequent to atomically copying the modification counter and the anchor address, the second variable is set to the next address included in the current element of the chain. Subsequent to determining that the anchor address is valid, the browse counter stored in the first variable is incremented. Subsequent to incrementing the browse counter, the browse counter stored in the first variable is compared to a current value of the modification counter. The current value of the modification counter indicates any modification made to the chain in the second thread. The current element is updated to be the next element. Subsequent to updating the current element, the next element is updated to be an element of the plurality of elements that is referenced by an address included in the current element. The steps of setting the second variable to the next address, incrementing the browse counter in the first variable, comparing the browse counter to the current value of the modification counter, updating the current element, and updating the next element are repeated until a result of the comparing step is that the browse counter is less than or equal to the current value of the modification counter. In response to the comparing step, the computing system determines that the browse counter is less than or equal to the current value of the modification counter. In response to determining that the browse counter is less than or equal to the current value of the modification counter, the scan of the chain is determined to be invalid and an indication of the invalid scan is stored in a computer data storage unit.

Systems and computer program products corresponding to the above-summarized methods are also described herein.

BRIEF DESCRIPTION OF THE DRAWINGS

FIG. 5 is an example of z/OS® assembler code that implements the process of FIGS. 1A-1B, in accordance with embodiments of the present invention.

DETAILED DESCRIPTION OF THE INVENTION

Overview

Figure 1A:
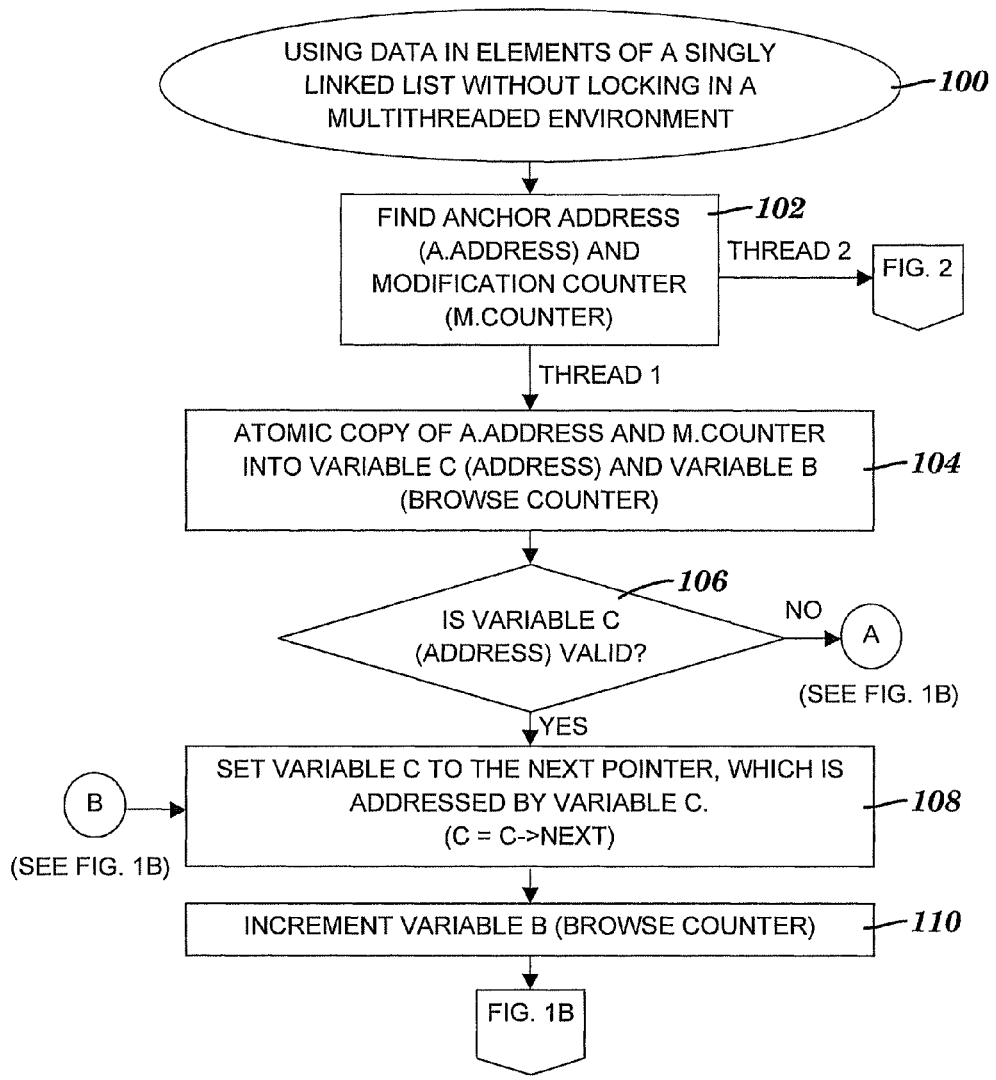
FIGS. 1A-1B depict a flowchart of a process for using data in elements of an unused element chain without locking in a multithreaded environment, in accordance with embodiments of the present invention.

The present invention provides a multithreaded technique for safely scanning (i.e., searching or browsing) and validating data in an unused element chain in one thread, where updates to the data may be performed in another thread concurrently with the scanning and validating, but where a lock is not required. Furthermore, the thread that performs the scanning and validating does not use a compare and swap operation. If the unused element chain is modified during data validation to an extent to which guaranteeing the validity of the data being used is not possible, then optionally the unused element chain may be scanned again from the start of the unused element chain.

A computer-based system that implements the scanning and validation process includes multithreaded tasks where each element (i.e., item or node) in the unused element chain is currently unused by any of the tasks. Data storage used for elements in the unused element chain is not freed while the unused element chain exists and thus, the storage can validly be read by a task of the system (i.e., a task may validly have an address to an element of the unused element chain). Using storage in this manner occurs, for example, in programs that manage their own storage after obtaining the storage from a system.

The technique described herein may also be applied to other threadsafe lists and for checking the contents of used storage.

As used herein, an unused element chain is defined as a last-in-first out (LIFO) singly linked list (a.k.a. stack) data structure that has one or more elements and has the following characteristics:
1. There exists a header that includes an anchor address and a modification counter for the unused element chain.
2. Any action performed on the unused element chain is limited to either adding an element to the head of the unused element chain or removing an element from the head of the unused element chain. Adding an element to the head of the unused element chain means that the added element is the new first element (i.e., topmost element) of the unused element chain. An addition of an element to the head of the unused element chain is also referred to herein as an insertion of an element. Removing an element from the head of the unused element chain means that the first element (i.e., topmost element) of the unused element chain is deleted.
3. Except for the last element, each element of the unused element chain includes the address of the next element.
4. The last element of the unused element chain includes a null pointer.

As used herein, an anchor address is defined as an address that points to the first element (a.k.a. head) of the unused element chain. As used herein, a modification counter is defined as a counter that is incremented in response to adding a new element to the head of the unused element chain or removing an element from the head of the unused element chain. Hereinafter, an unused element chain is also referred to simply as a chain.

Unused Element Chain Scanning and Validation Process

Figure 1B:
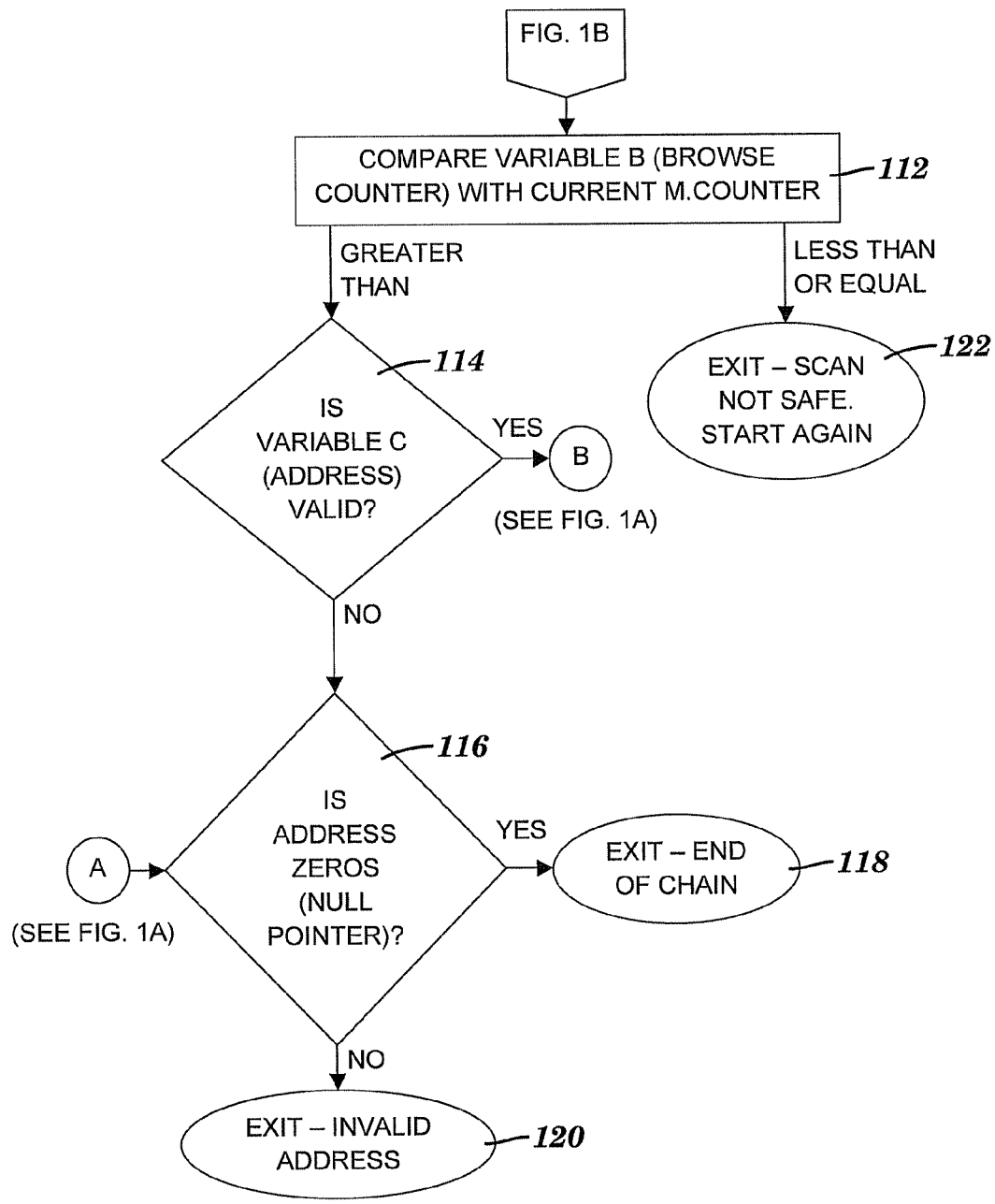

FIGS. 1A-1B depict a flowchart of a process for using data in elements of an unused element chain without locking in a multithreaded computing environment, in accordance with embodiments of the present invention. Each of the steps described in this section is performed by a computing system (e.g., the computing system described below relative to FIG. 6) that processes instructions for using data in elements of a singly linked list without locking in a multithreaded environment.

The process of using data in elements of a chain without locking in a multithreaded environment starts at step 100. The usage of data in the process of FIGS. 1A-1B is described herein as validating addresses in elements of a chain, but the present invention contemplates other types of usage of data in elements of a chain. Validating addresses in elements of a chain is also referred to herein as validating the chain.

In step 102, the computing system accesses the header of the chain to locate the anchor address (a.k.a. A.Address) and the modification counter (a.k.a. M.Counter) stored in the header. A first thread and a second thread are executed by the computing system after step 102. The execution of the first thread performs the steps of FIGS. 1A-1B described below starting with step 104. The execution of the second thread performs the steps described below relative to FIG. 2. In one embodiment, the chain and the chain's header are stored in a data storage unit coupled to the computing system of FIG. 6 or coupled to another computing system that is in communication via a computer network with the computing system of FIG. 6.

In step 104, the computing system takes from the chain's header a consistent copy (i.e., atomic copy) of the anchor address and the modification counter (e.g., by using a Load Multiple operation provided by z/OS® assembler code). The atomic copy of step 104 initializes one local variable (also referred to herein as variable B) as the modification counter and another local variable (also referred to herein as variable C) as the anchor address. The content of variable B is also referred to herein as the browse counter. The content of variable C is an address that references an element in the chain, where the element is currently being scanned in the process of FIGS. 1A-1B. The element in the chain referenced by variable C is also referred to herein as the current element. The current element is initially the first element of the chain.

Figure 6:
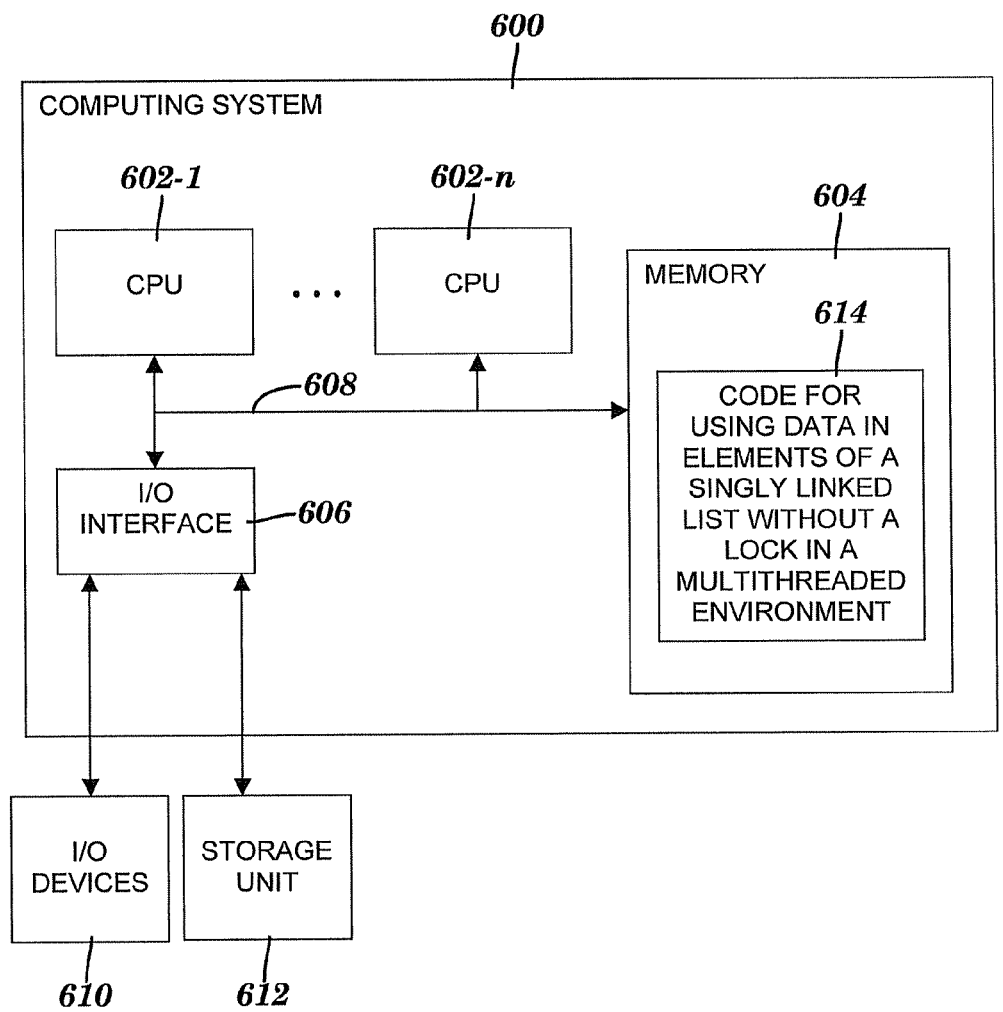
FIG. 6 is a block diagram of a computing system that implements the processes of FIGS. 1A-1B and FIG. 2, in accordance with embodiments of the present invention.

In one embodiment, variable B and variable C are stored in memory included in the computing system of FIG. 6. In another embodiment, variable B and variable C are stored in a data storage unit coupled to the computing system of FIG. 6 or coupled to another computing system that is in communication via a computer network with the computing system of FIG. 6.

If inquiry step 106 determines that the address in variable C is a valid address based on a predefined criterion, then the process of FIGS. 1A-1B continues with step 108; otherwise, the address in variable C is either a null pointer or invalid and the process continues with step 116 of FIG. 1B.

In one embodiment, the computing system identifies a valid address in variable C in step 106 if the high bit (i.e., most significant bit) of variable C's contents is not set (i.e., if the high bit is zero) and identifies an invalid address if the high bit is set (i.e., if the high bit is not zero). In one example, the aforementioned predefined criterion is a predefined condition that states that a most significant bit of the address in variable C is not set, where the address in variable C is determined to be valid if the predefined condition is true and the address in variable C is determined to be not valid if the predefined condition is false. Variable C includes an invalid address, for instance, as a result of the anchor address being overwritten by character data.

In step 108, the computing system sets variable C to a copy of a next pointer (i.e., a next address), which is included in the current element of the chain being scanned. Thus, step 108 sets the address in variable C to the address that references the next element in the chain (e.g., by using C=C−>next). For example, if the address in variable C immediately prior to step 108 references the Nth element of the chain, then step 108 sets variable C to the address included in the Nth element, which is the address that points to the next element in the chain (i.e., the address that references the (N+1)-th element of the chain).

In step 110, the browse counter in variable B is incremented by a predefined amount (e.g., incremented by 1) to indicate that the scan of the chain has advanced to an element in the chain where the next address stored in that element (i.e., the address stored in variable C in step 108) is ready to be validated at the upcoming step 114 of FIG. 1B. Following step 110, the process continues with step 112 in FIG. 1B.

In step 112 of FIG. 1B, the computing system compares the browse counter in variable B to a current value of the modification counter that is included in the header. The current value of the modification counter may be an update of the modification counter copied in step 104 of FIG. 1A based on any insertions (i.e., additions to the head of the chain) and/or removals performed in the second thread, which is described below relative to FIG. 2. That is, each insertion in the second thread and each removal in the second thread increments the modification counter by a predefined amount (e.g., increments the modification counter by 1). If step 112 determines that the browse counter in variable B is greater than the modification counter, then the process continues with step 114.

If the computing system determines in step 114 that the address in variable C is valid based on the aforementioned predefined criterion, then the scan is determined to be valid up to the current element of the chain, the scan continues with the current element updated to be the aforementioned next element and with the next element updated to be an element of the chain that is referenced by an address included in the updated current element, and the process of FIGS. 1A-1B loops back to step 108 of FIG. 1A (i.e., step 114 determines that there is another element that has not yet been scanned by the process of FIGS. 1A-1B); otherwise, the address in variable C is either a null pointer or invalid and the process continues with step 116.

In one embodiment, the determination of a valid address in step 114 uses the same address validation technique used in step 106 of FIG. 1A. In one example, step 114 uses a predefined condition that states that a most significant bit of the address stored in variable C is not set, where the address in variable C is determined to be valid if the predefined condition is true and the address in variable C is determined to be not valid if the predefined condition is false.

The loop starting at step 108 of FIG. 1A continues until the No branch of step 114 is taken (i.e., the address in variable C is found to be either invalid or a null pointer), or until the number of modifications to the chain made via the second thread (see FIG. 2) is "too many"—meaning that the current modification counter reaches a level such that step 112 indicates that the browse counter is less than or equal to the current modification counter.

If inquiry step 116 determines that the address in variable C is a null pointer (e.g., the address in variable C is zeros), then the process exits at step 118, indicating that there are no more elements in the chain remaining to be scanned and the scan has completed successfully with no indication of an invalid address in the chain (i.e., the scan of the entire chain is valid).

In one embodiment, step 118 includes storing an indication that the scan of the entire chain is valid in a computer data storage unit that is coupled to either the computing system of FIG. 6 or another computing system that is in communication via a network with the computing system of FIG. 6. In one embodiment, step 118 includes displaying the indication of a valid scan on a display device that is coupled to either the computing system of FIG. 6 or another computing system in communication via a network with the computing system of FIG. 6.

If inquiry step 116 determines that the address in variable C is not a null pointer (e.g., the address in variable C is not zero), then the process returns a validation error that indicates that an invalid address is identified by steps 114 and 116 and the process exits at step 120.

In one embodiment, step 120 includes storing the indication of the invalid address in a computer data storage unit that is coupled to either the computing system of FIG. 6 or another computing system that is in communication via a network with the computing system of FIG. 6. In one embodiment, step 120 includes displaying the indication of the invalid address on a display device that is coupled to either the computing system of FIG. 6 or another computing system in communication via a network with the computing system of FIG. 6.

Returning to step 112, if the browse counter in variable B is less than or equal to the modification counter, then in step 122 the computing system determines that the contents of the chain are not safe to use (i.e., the scan of the chain is determined to be not valid (a.k.a. not safe)), the process exits and the chain is optionally re-scanned starting at the head of the chain. For example, step 122 may determine that the scan is not safe because the content of variable C was set in step 108 of FIG. 1A using an address in an element that is no longer in the chain.

In one embodiment, step 122 includes storing an indication that the scan is not safe in a computer data storage unit that is coupled to either the computing system of FIG. 6 or another computing system that is in communication via a network with the computing system of FIG. 6. In one embodiment, step 122 includes displaying the indication of the unsafe scan on a display device that is coupled to either the computing system of FIG. 6 or another computing system in communication via a network with the computing system of FIG. 6.

Since the browse counter in variable B is incremented in step 110 of FIG. 1A, the address validation in the process of FIGS. 1A-1B tolerates changes at the head of the chain. Thus, if the modification counter is less than the browse counter in variable B (i.e., the browse counter is greater than the modification counter), then the content of variable C was set in step 108 of FIG. 1A using an element that was still in the chain, and validation of the address in variable C and the rest of the chain can still continue via step 114 and subsequent steps of the process of FIGS. 1A-1B. Using the same example described above relative to step 108, if the browse counter is greater than the modification counter, then step 108 set variable C to the address included in the Nth element, the Nth element is still in the chain, and the scanning and validation process continues with the (N+1)-th element of the chain.

Figure 2:
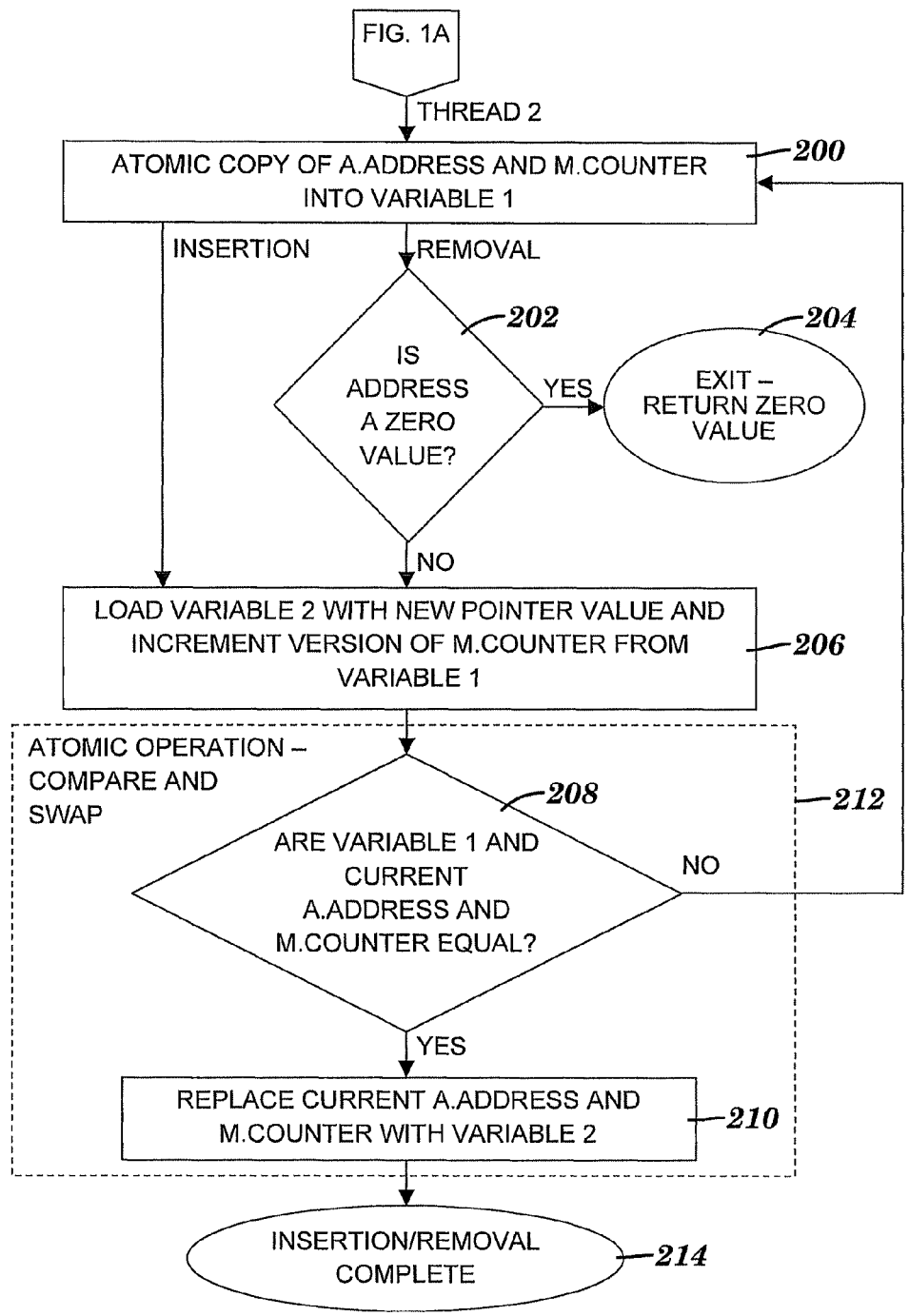
FIG. 2 is a flowchart of a process of adding elements to or removing elements from the unused element chain whose data is being used in the process of FIGS. 1A-1B, in accordance with embodiments of the present invention.

FIG. 2 is a flowchart of a process of adding elements to or removing elements from the unused element chain whose data is being used in the process of FIGS. 1A-1B, in accordance with embodiments of the present invention. The process of FIG. 2 includes the actions performed on the chain by the second thread that begins after step 102 of FIG. 1A. The second thread runs concurrently with the first thread described above relative to FIGS. 1A-1B. In step 200, the computing system performs an atomic copy of the chain's anchor address (A.Address) and the chain's modification counter (M.Counter) into a first variable (hereinafter, referred to as variable 1). If the action being performed in the second thread is a removal of the element at the head of the chain, then the process of FIG. 2 continues with step 202. If inquiry step 202 determines that the address in the element at the head of the chain is a null pointer (e.g., a zero value), then the process of FIG. 2 returns a zero value and exits at step 204; otherwise the process continues with step 206. Step 206 also follows step 200 if the action being performed in the second thread is an insertion of a new element to the chain (i.e., an addition of a new element to the head of the chain).

In step 206, the computing system loads a second variable (hereinafter referred to as variable 2) with a new pointer value and an incremented version of M.Counter (i.e., M.Counter+1), which is a result of incrementing M.Counter copied from variable 1. The new pointer value loaded in step 206 is the address referencing (1) the new element being inserted at the head of the chain if the second thread is performing an insertion or (2) the next element in the chain relative to the element being removed if the second thread is performing a removal.

If inquiry step 208 determines that the values in variable 1 equal the current A.Address and the current M.Counter, which are included in the header of the chain, then in step 210 the computing system replaces the current A.Address with the pointer value copied from variable 2 (i.e., the pointer value loaded in step 206) and replaces the current M.Counter with the incremented version of M.Counter (i.e., M.Counter+1) copied from variable 2 (i.e., the M.Counter+1 loaded in step 206). Steps 208 and 210 comprise a compare and swap atomic operation in the process of FIG. 2.

Following step 210, the process of FIG. 2 ends at step 214, indicating that the insertion or removal being performed by the second thread is complete.

Returning to step 208, if the values of variable 1 are not equal to the current A.Address and the current M.Counter, then the process of FIG. 2 loops back to step 200.

EXAMPLES

Figure 3A:
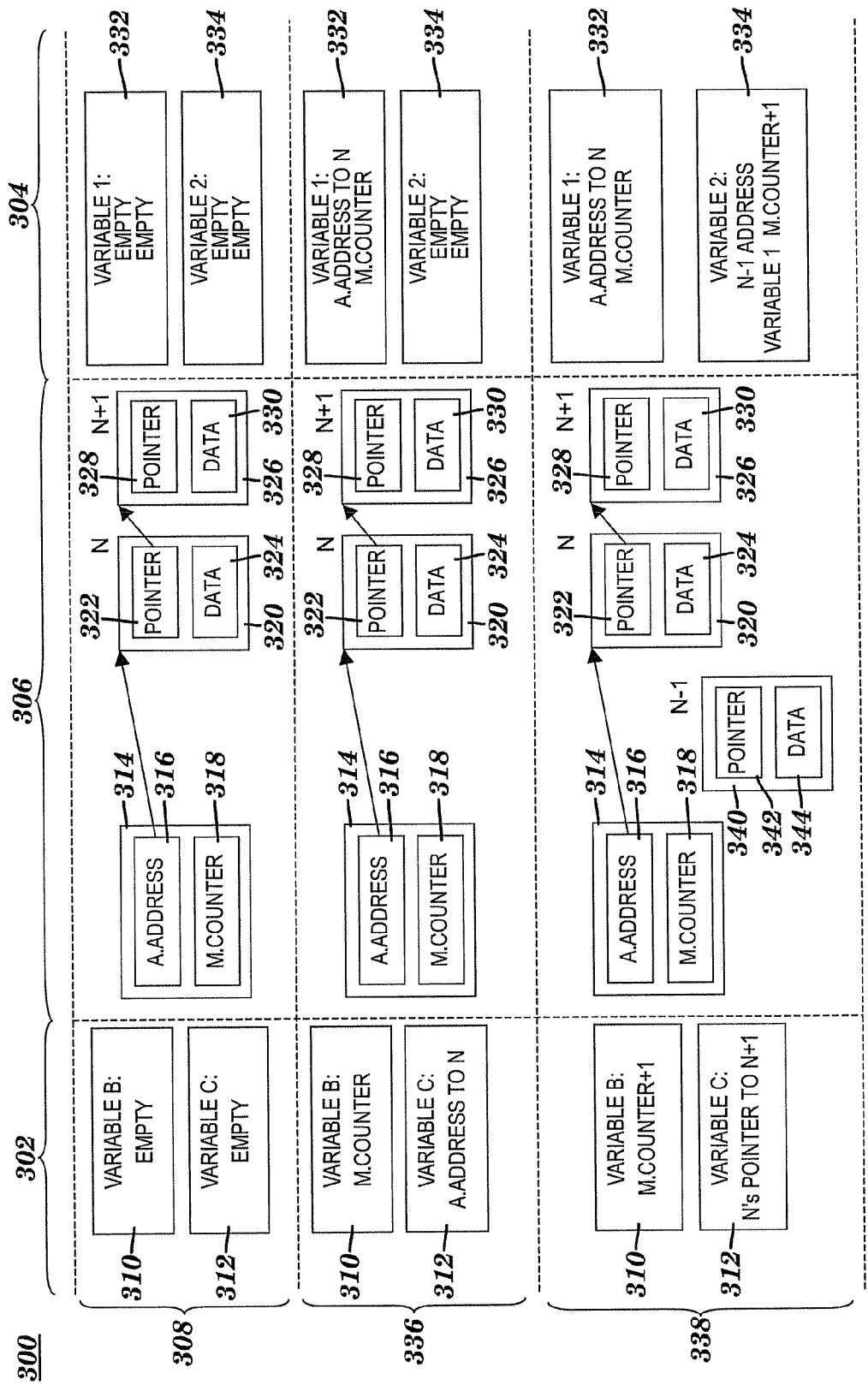
FIGS. 3A-3B is an example of the processes of FIGS. 1A-1B and FIG. 2, where the example includes adding an element to an unused element chain that is being scanned and validated, in accordance with embodiments of the present invention.
Figure 3B:
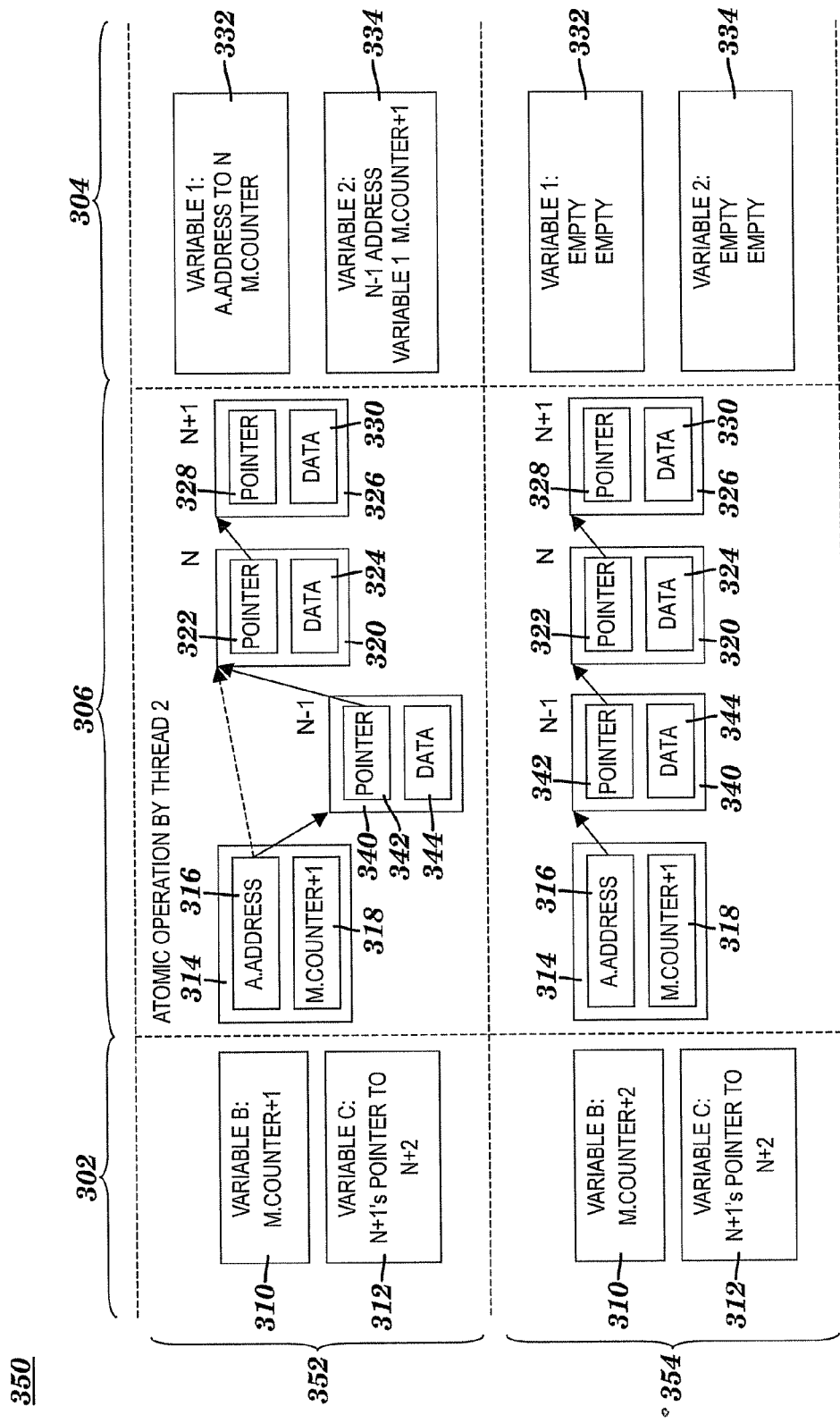

FIGS. 3A-3B is an example (a.k.a. insertion example) of the processes of FIGS. 1A-1B and FIG. 2, where the example includes adding an element to an unused element chain that is being scanned and validated, in accordance with embodiments of the present invention. In FIG. 3A, a first portion 300 of the insertion example includes a local storage 302 used by the first thread in the process of FIGS. 1A-1B, a local storage 304 used by the second threads in the process of FIG. 2, and an exemplary chain 306. At a time 308, which is prior to step 102 of FIG. 1A and step 200 of FIG. 2, variable 310 (i.e., variable B) and variable 312 (i.e., variable C) in local storage 302 are both empty.

At time 308, chain 306 includes a header 314 that includes an anchor address 316 (i.e., A.Address) and a modification counter 318 (i.e., M.Counter). A.Address in header 314 references the head of chain 306, which is element 320 (i.e., element N or the N-th element). Element 320 includes a pointer 322 and a data item 324. Pointer 322 references the next element in chain 306, which is element 326 (i.e., element N+1 or the (N+1)-th element). Element 326 includes a pointer 328 and a data item 330. Also at time 308, variable 332 (i.e., variable 1) and variable 334 (i.e., variable 2) in local storage 304 are both empty.

Although not shown in FIGS. 3A-3B, chain 306 may include additional elements such as an (N+2)-th element (i.e., element N+2) that is referenced by pointer 328.

At time 336, which is after steps 102, 104 and 106 of FIG. 1A are completed, variable B includes the current modification counter (i.e., M.Counter) copied from header 314 (see step 104 of FIG. 1A) and variable C includes A.Address copied from header 314 (see step 104 of FIG. 1A), where A.Address references the N-th element of chain 306. Chain 306 at time 336 is identical to chain 306 at time 308.

Also at time 336, variable 1 includes A.Address copied from header 314, where A.Address references the N-th element of chain 306 (see step 200 of FIG. 2). Further, at time 336, variable 1 includes M.Counter copied from header 314 (see step 200 of FIG. 2). Still further, variable 2 remains empty at time 336.

At time 338, which is after steps 108 and 110 of FIG. 1A and after steps 112 and 114 of FIG. 1B, variable B includes M.Counter+1 (i.e., the incremented browse counter) (see step 110 of FIG. 1A) and variable C includes the N-th element's pointer to the (N+1)-th element (see step 108 of FIG. 1A). Since M.Counter+1 in variable B is greater than the current modification counter (i.e., M.Counter) in header 314 (see steps 112 and 114 of FIG. 1B), the process in FIGS. 1A-1B loops back to step 108 (see FIG. 1A). Element 340 (i.e., element N−1 or the (N−1)-th element) is an element to be added to the head of chain 306. Element 340 includes a pointer 342 and a data item 344.

Also at time 338, variable 1 is unchanged from time 336. Furthermore, at time 338, variable 2 includes the following items: an address referencing element N−1 and M.Counter+1, which is a result of incrementing the M.Counter value copied from variable 1 (see step 206 of FIG. 2).

In FIG. 3B, a second portion 350 of the insertion example includes local storage 302, local storage 304, and chain 306. At time 352, which is after step 108 of FIG. 1A is completed in the first iteration of the loop that started after step 114 of FIG. 1B, variable B is unchanged from time 338 (see FIG. 3A) and variable C includes element N+1's pointer to element N+2 (see step 108 of FIG. 1A).

Time 352 is also after atomic operation 212 of FIG. 2 is completed. Thus, at time 352 A.Address 316 in header 314 now points to the new (N−1)-th element and pointer 342 in the (N−1)-th element points to the N-th element, thereby making the (N−1)-th element the new head of chain 306. Further, variable 1 and variable 2 are unchanged from time 338 in FIG. 3A. Still further, modification counter 318 in header 314 is updated to M.Counter+1 to indicate that element N−1 is now inserted into chain 306.

At time 354, which is after step 110 of FIG. 1A is completed in the first iteration of the aforementioned loop, variable B now includes M.Counter+2, which is a result of incrementing the browse counter in variable B in step 110 of FIG. 1A. Furthermore, at time 354, variable C is unchanged from time 352. Also at time 354, the second thread is complete and variable 1 and variable 2 are both re-initialized to be empty.

Since M.Counter+2 in variable B is greater than M.Counter+1 in header 314 (see step 112 of FIG. 1B), the scanning and validation of chain 306 continues with the next element (i.e., element 326) in the chain. That is, step 114 of FIG. 1B checks if pointer 328 is valid.

Figure 4A:
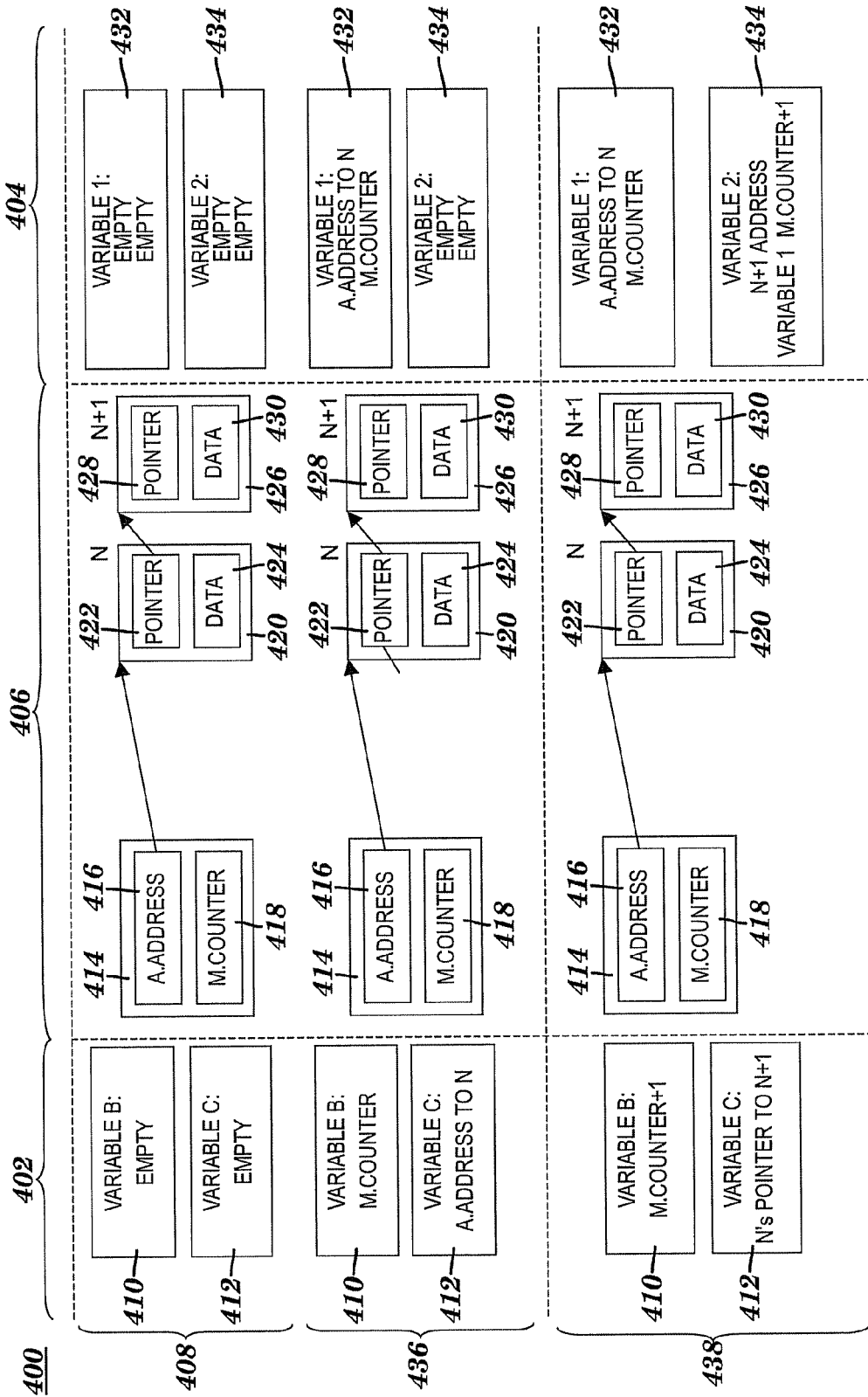
FIGS. 4A-4B is an example of the processes of FIGS. 1A-1B and FIG. 2, where the example includes removing an element from an unused element chain that is being scanned and validated, in accordance with embodiments of the present invention.
Figure 4B:
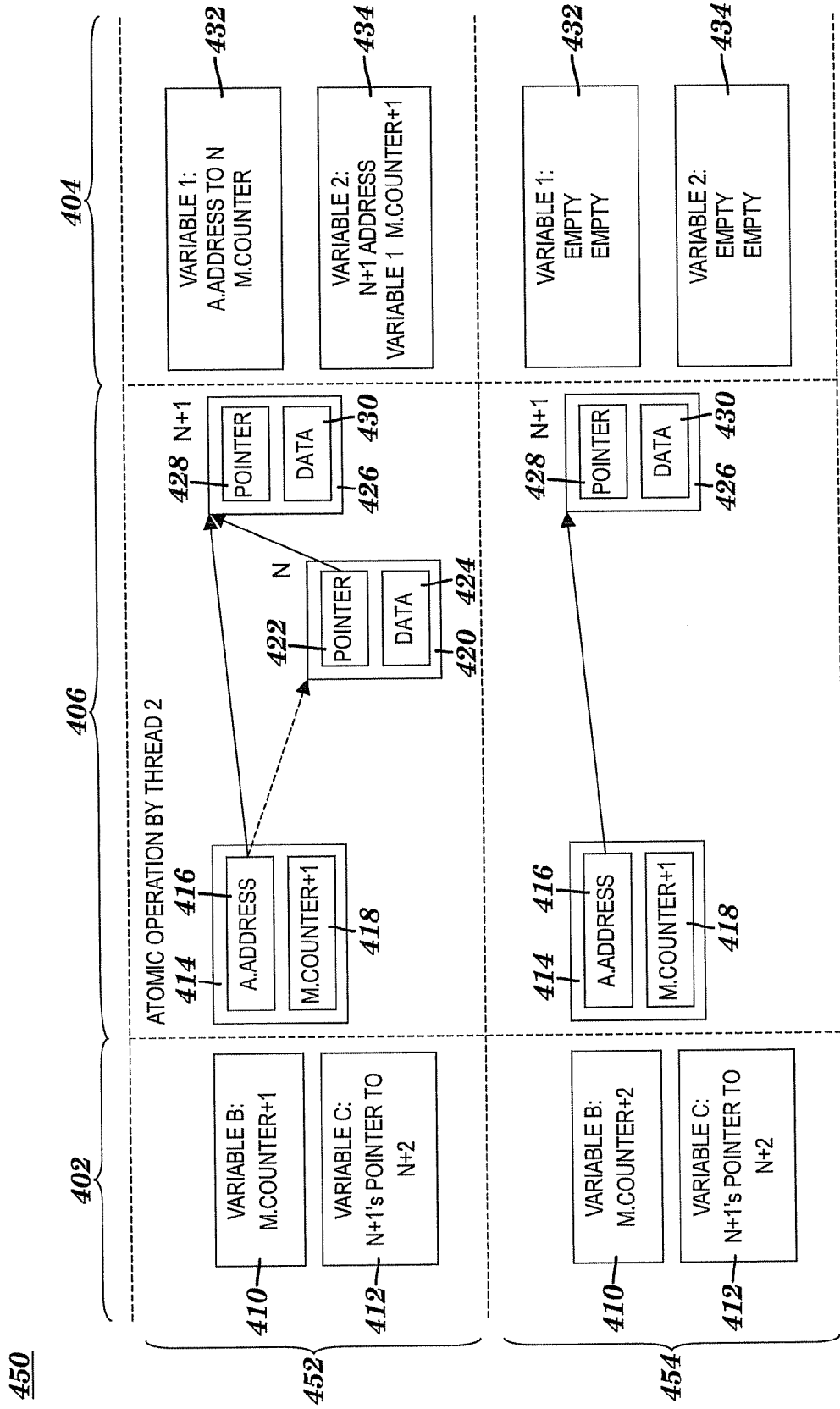

FIGS. 4A-4B is an example (a.k.a. removal example) of the processes of FIGS. 1A-1B and FIG. 2, where the example includes removing an element from an unused element chain that is being scanned and validated, in accordance with embodiments of the present invention. In FIG. 4A, a first portion 400 of the removal example includes a local storage 402 used by the first thread in the process of FIGS. 1A-1B, a local storage 404 used by the second thread in the process of FIG. 2, and an exemplary chain 406. At a time 408, which is prior to step 102 of FIG. 1A and step 200 of FIG. 2, variable 410 (i.e., variable B) and variable 412 (i.e., variable C) in local storage 402 are both empty.

At time 408, chain 406 includes a header 414 that includes an anchor address 416 (i.e., A.Address) and a modification counter 418 (i.e., M.Counter). A.Address in header 414 references the head of chain 406, which is element 420 (i.e., element N or the N-th element). Element 420 includes a pointer 422 and a data item 424. Pointer 422 references the next element in chain 406, which is element 426 (i.e., element N+1 or the (N+1)-th element). Element 426 includes a pointer 428 and a data item 430. Also at time 408, variable 432 (i.e., variable 1) and variable 434 (i.e., variable 2) in local storage 404 are both empty.

Although not shown in FIGS. 4A-4B, chain 406 may include additional elements such as an (N+2)-th element (i.e., element N+2) that is referenced by pointer 428.

At time 436, which is after steps 102, 104 and 106 of FIG. 1A are completed, variable B includes the current modification counter (i.e., M.Counter) copied from header 414 (see step 104 of FIG. 1A) and variable C includes A.Address copied from header 414 (see step 104 of FIG. 1A), where A.Address references the N-th element of chain 406. Chain 406 at time 436 is identical to chain 406 at time 408.

Also at time 436, variable 1 includes A.Address copied from header 414, where A.Address references the N-th element of chain 406 (see step 200 of FIG. 2). Further, at time 436, variable 1 includes M.Counter copied from header 414 (see step 200 of FIG. 2). Still further, variable 2 remains empty at time 436.

At time 438, which is after steps 108 and 110 of FIG. 1A and after steps 112 and 114 of FIG. 1B, variable B includes M.Counter+1 (i.e., the incremented browse counter) (see step 110 of FIG. 1A) and variable C includes the N-th element's pointer to the (N+1)-th element (see step 108 of FIG. 1A). Since M.Counter+1 in variable B is greater than the current modification counter (i.e., M.Counter) in header 414 (see steps 112 and 114 of FIG. 1B), the process in FIGS. 1A-1B loops back to step 108 (see FIG. 1A). Also at time 438, chain 406 remains unchanged from time 436.

Further, at time 438, variable 1 is unchanged from time 436. Still further, at time 438, variable 2 includes the following items: an address referencing element N+1 and M.Counter+1, which is a result of incrementing the M.Counter value copied from variable 1 (see step 206 of FIG. 2).

In FIG. 4B, a second portion 450 of the removal example includes local storage 402, local storage 404, and chain 406. At time 452, which is after step 108 of FIG. 1A is completed in the first iteration of the loop that started after step 114 of FIG. 1B, variable B is unchanged from time 438 (see FIG. 4A) and variable C includes element N+1's pointer to element N+2 (see step 108 of FIG. 1A).

Time 452 is also after atomic operation 212 of FIG. 2 is completed. Thus, at time 452 A.Address 416 in header 414 now points to the (N+1)-th element of chain 406, thereby making the (N+1)-th element the head of chain 406. Further, variable 1 and variable 2 are unchanged from time 438 (see FIG. 4A). Still further, modification counter 418 in header 414 is updated to M.Counter+1 to indicate that element N is now removed from chain 406.

At time 454, which is after step 110 of FIG. 1A is completed in the first iteration of the aforementioned loop in the removal example, variable B now includes M.Counter+2, which is a result of incrementing the browse counter in variable B in step 110 of FIG. 1A. Further, at time 454, variable C is unchanged from time 452. Still further, the N-th element is deleted. Also at time 454, the second thread is complete and variable 1 and variable 2 are both re-initialized to be empty.

Since M.Counter+2 in variable B is greater than M.Counter+1 in header 414 (see step 112 of FIG. 1B), the scanning and validation of chain 406 continues with the next element (i.e., element 426) in the chain. That is, step 114 of FIG. 1B checks if pointer 428 is valid.

FIG. 5 is an example of z/OS® assembler code 500 that implements the process of FIGS. 1A-1B, in accordance with embodiments of the present invention. Code 500 is, for example, executed by the computing system described below relative to FIG. 6. The $7^{th}$ and $18^{th}$ lines of code 500 (i.e., BNL DUMPIT) correspond to an invalid address being determined at step 120 (see FIG. 1B). In one embodiment, the $7^{th}$ and $18^{th}$ lines of code 500 generate diagnostics that are (1) displayed on a display device coupled to the computing system of FIG. 6 and/or (2) stored in a computer data storage device coupled to the computing system of FIG. 6. The diagnostics may include, for example, indications of which bits are set in an address included in an element of the chain being validated.

The $12^{th}$ line of code 500 (i.e., BNH TRACEIT) corresponds to the scan of the chain being identified as unsafe and the start of a rescan of the chain in step 122 (see FIG. 1B). In one embodiment, the 12th line of code 500 generates diagnostics that are (1) displayed on a display device coupled to the computing system of FIG. 6 and/or (2) stored in a computer data storage device coupled to the computing system of FIG. 6.

Computing System

FIG. 6 is a block diagram of a computing system that implements the processes of FIGS. 1A-1B and FIG. 2 and provides a multithreaded environment, in accordance with embodiments of the present invention. Computing system 600 generally comprises one or more central processing units (CPUs) 602-1 . . . 602-n, a memory 604, an input/output (I/O) interface 606, and a bus 608. Further, computing system 600 is coupled to I/O devices 610 and a computer data storage unit 612. CPUs 602-1 . . . 602-n perform computation and control functions of computing system 600, including concurrent processing of multiple threads such as the first thread and the second thread described above relative to FIGS. 1A-1B.

Memory 604 may comprise any known type of computer data storage and/or transmission media, including bulk storage, magnetic media, optical media, random access memory (RAM), read-only memory (ROM), a data cache, a data object, etc. In one embodiment, cache memory elements of memory 604 provide temporary storage of at least some program code in order to reduce the number of times code must be retrieved from bulk storage during execution. Moreover, similar to each of the CPUs 602-1 . . . 602-n, memory 604 may reside at a single physical location, comprising one or more types of data storage, or be distributed across a plurality of physical systems in various forms. Further, memory 604 can include data distributed across, for example, a local area network (LAN) or a wide area network (WAN). In one embodiment, memory 604 stores variable B and variable C, which are described above relative to FIGS. 1A-1B.

I/O interface 606 comprises any system for exchanging information to or from an external source. I/O devices 610 comprise any known type of external device, including a display device (e.g., monitor), keyboard, mouse, printer, speakers, handheld device, facsimile, etc. In one embodiment, an I/O device 610 such as a display device displays an indication of a valid scan, an indication of an invalid address, and/or an indication of an unsafe scan that are determined in the process of FIGS. 1A-1B. In another embodiment, the indication of the valid scan, the invalid address and/or the unsafe scan is displayed by an I/O device coupled to another computing system (not shown) that is in communication with computing system 600 via a computer network (not shown). Bus 608 provides a communication link between each of the components in computing system 600, and may comprise any type of transmission link, including electrical, optical, wireless, etc.

I/O interface 606 also allows computing system 600 to store and retrieve information (e.g., program instructions or data) from an auxiliary storage device (e.g., computer data storage unit 612). The auxiliary storage device may be a non-volatile storage device, such as a hard disk drive or an optical disc drive (e.g., a CD-ROM drive which receives a CD-ROM disk). Computer data storage unit 612 is, for example, a magnetic disk drive (i.e., hard disk drive) or an optical disk drive. In one embodiment, computer data storage unit 612 or another computer data storage unit (not shown) coupled to computing system 600 stores an indication of a valid scan, an indication of an invalid address, and/or an indication of an unsafe scan that are determined in the process of FIGS. 1A-1B. In another embodiment, the indication of the valid scan, the invalid address and/or the unsafe scan is stored in a computer data storage unit coupled to another computing system (not shown) that is in communication with computing system 600 via a computer network (not shown).

In one embodiment, computer data storage unit 612 or another computer data storage unit (not shown) that is coupled to computing system 600 stores the chain being scanned and validated in the process of FIGS. 1A-1B, as well as the chain's anchor address and modification counter.

Memory 604 includes computer program code 614 that provides the logic for using data in elements of a singly linked list without locking in a multithreaded environment (e.g., the processes of FIGS. 1A-1B and FIG. 2). Further, memory 604 may include other systems not shown in FIG. 6, such as an operating system (e.g., Linux) that runs on CPUs 602-1 . . . 602-n and provides control of various components within and/or connected to computing system 600.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system" (e.g., system 600). Furthermore, the present invention may take the form of a computer program product embodied in any tangible medium of expression (e.g., memory 604) having computer-usable program code (e.g., code 614) embodied in the medium.

Any combination of one or more computer-usable or computer-readable medium(s) (e.g., memory 604 and computer data storage unit 612) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., code 614) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer (e.g., computing system 600), partly on the user's computer, as a stand-alone software package, partly on the user's computer and partly on a remote computer or entirely on the remote computer or server. In the latter scenario, the remote computer may be connected to the user's computer through any type of network, including a LAN, a WAN, or the connection may be made to an external computer (e.g., through the Internet using an Internet Service Provider).

The present invention is described herein with reference to flowchart illustrations (e.g., FIGS. 1A-1B) and/or block diagrams of methods, apparatus (systems) (e.g., FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 614). These computer program instructions may be provided to a processor (e.g., CPU 602-1) of a general purpose computer (e.g., computing system 600), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 604 or computer data storage unit 612) that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computing system 600) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in FIGS. 1A-1B and FIG. 2 illustrate the architecture, functionality, and operation of possible implementations of systems, methods, and computer program products according to various embodiments of the present invention. In this regard, each block in the flowchart or block diagrams may represent a module, segment, or portion of code (e.g., code 614), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method for validating a scan of an unused element chain in a multithreaded computing environment, said method comprising:
   executing, by a computing system, a first thread and a second thread in said multithreaded computing environment;
   atomically copying, by a computing system, using said first thread, and from a header of said unused element chain (chain), a modification counter into a first variable and an anchor address into a second variable, wherein said atomically copying includes initially setting a browse counter in said first variable to said modification counter, and wherein said chain is a singly linked list data structure;
   setting, by said computing system, using said first thread and subsequent to said atomically copying, said second variable to a next address stored in a current element of said chain, wherein said next address references a next element of said chain, wherein said current element is initially a first element of said chain, and wherein said first element is referenced by said anchor address;
   incrementing, by said computing system, using said first thread and subsequent to said atomically copying, said browse counter stored in said first variable to indicate an advance of said scan;
   determining, by said computing system and subsequent to said setting and said incrementing, that said browse counter is greater than a current value of said modification counter, wherein said current value of said modification counter indicates any modification made to said chain by said second thread;
   determining, by said computing system and in response to said determining that said browse counter is greater than said current value of said modification counter, that said scan of said chain is valid up to said current element of said chain;
   concluding, by said computing system, said scan of said chain; and
   storing, by said computing system and in response to said concluding said scan, an indication of a result of said scan, wherein said indication of said result is selected from the group consisting of an indication that said scan is valid and an indication that said next address is an invalid address, and wherein said storing said indication of said result includes storing said indication of said result in a first computer data storage unit coupled to said computing system or in a second computer data storage unit coupled to another computing system.

2. The method of claim 1, wherein said concluding said scan comprises completing, by said computing system, said scan of said chain while said browse counter is greater than said current value of said modification counter, and wherein said indication of said result of said scan is said indication that said scan is valid.

3. The method of claim 1, further comprising storing said chain in a computer data storage area that is not freed while said chain exists.

4. The method of claim 1, further comprising:
   locating, by said computing system and prior to said atomically copying, said header of said chain, wherein said header and said chain are stored in a computer data storage unit;
   determining, by said computing system, subsequent to said atomically copying, and prior to said setting said second variable, that said anchor address in said second variable is valid based on a predefined criterion;
   determining, by said computing system and subsequent to said setting said second variable to said next address, that said next address is valid based on said predefined criterion; and
   continuing said scan with a next element in said chain in response to said determining that said next address is valid.

5. The method of claim 1, further comprising:
   locating, by said computing system and prior to said atomically copying, said header of said chain, wherein said header and said chain are stored in a computer data storage unit;
   determining, by said computing system, subsequent to said atomically copying, and prior to said setting said second variable, that said anchor address in said second variable is valid based on a predefined condition being false;
   determining, by said computing system and subsequent to said setting said second variable, that said next address is not valid based on said predefined condition being true; and
   determining, by said computing system and subsequent to said determining that said next address is not valid, that said next address is not a null pointer,
   wherein said concluding said scan comprises stopping said scan by said computing system and in response to said determining that said next address is not valid and in response to said determining that said next address is not said null pointer, and wherein said indication of said result of said scan is said indication that said next address is an invalid address.

6. The method of claim 5, wherein said predefined condition is a most significant bit of said second variable is set.

7. The method of claim 1, wherein said first variable and said second variable are stored in a first computer data storage unit coupled to said computing system or in a second computer data storage unit coupled to another computing system, and wherein said chain is stored in said first computer data storage unit or said second computer data storage unit.

8. The method of claim 1, wherein said modification counter is a running count of one or more actions performed on said chain by said second thread, and wherein each action of said one or more actions is an action selected from the group of an addition of a new element as a new first element of said chain and a removal of said first element from said chain.

9. A computing system comprising a processor coupled to a computer-readable memory unit, said memory unit comprising a software application, said software application comprising instructions that when executed by said processor implement the method of claim 1.

10. A computer program product, comprising:
a tangible, computer-readable storage device having a computer-readable program code stored therein, said computer-readable program code containing instructions that when executed by a processor of a computing system implement a method of validating a scan of an unused element chain in a multithreaded computing environment, said method comprising:
executing a first thread and a second thread in said multithreaded computing environment;
atomically copying, using said first thread and from a header of said unused element chain (chain), a modification counter into a first variable and an anchor address into a second variable, wherein a result of said atomically copying is initially setting a browse counter in said first variable to said modification counter, and wherein said chain is a singly linked list data structure;
setting, using said first thread and subsequent to said atomically copying, said second variable to a next address stored in a current element of said chain, wherein said next address references a next element of said chain, wherein said current element is initially a first element of said chain, and wherein said first element is referenced by said anchor address;
incrementing, using said first thread and subsequent to said atomically copying, said browse counter stored in said first variable to indicate an advance of said scan to said next element of said chain;
determining, subsequent to said setting and said incrementing, that said browse counter is greater than a current value of said modification counter, wherein said current value of said modification counter indicates any modification made to said chain by said second thread;
determining, in response to said determining that said browse counter is greater than said current value of said modification counter, that said scan of said chain is valid up to said next element of said chain;
concluding said scan of said chain; and
storing, in response to said concluding said scan, an indication of a result of said scan, wherein said indication of said result is selected from the group consisting of an indication that said scan is valid and an indication that said next address is an invalid address, and wherein said storing said indication of said result includes storing said indication of said result in a first computer data storage unit coupled to said computing system or in a second computer data storage unit coupled to another computing system.

11. The program product of claim 10, wherein said concluding said scan comprises completing said scan of said chain while said browse counter is greater than said current value of said modification counter, and wherein said indication of said result of said scan is said indication that said scan is valid.

12. The program product of claim 10, wherein said method further comprises storing said chain in a computer data storage area that is not freed while said chain exists.

13. The program product of claim 10, wherein said method further comprises:
locating, prior to said atomically copying, said header of said chain, wherein said header and said chain are stored in a computer data storage unit;
determining, subsequent to said atomically copying and prior to said setting said second variable, that said anchor address in said second variable is valid based on a predefined criterion;
determining, subsequent to said setting said second variable to said next address, that said next address is valid based on said predefined criterion; and
continuing said scan with said next element of said chain in response to said determining that said next address is valid.

14. The program product of claim 10, wherein said method further comprises:
locating, prior to said atomically copying, said header of said chain, wherein said header and said chain are stored in a computer data storage unit;
determining, subsequent to said atomically copying and prior to said setting said second variable, that said anchor address in said second variable is valid based on a predefined condition being false;
determining, subsequent to said setting said second variable, that said next address is not valid based on said predefined condition being true; and
determining, subsequent to said determining that said next address is not valid, that said next address is not a null pointer,
wherein said concluding said scan comprises stopping said scan in response to said determining that said next address is not valid and in response to said determining that said next address is not said null pointer, and
wherein said indication of said result of said scan is said indication that said next address is an invalid address.

15. A computer-implemented method for detecting an invalid scan of an unused element chain in a multithreaded computing environment, said method comprising:
executing, by a computing system, a first thread and a second thread in said multithreaded computing environment;
atomically copying, by a computing system, using said first thread, and from a header of said unused element chain (chain), a modification counter into a first variable and an anchor address into a second variable, wherein said atomically copying includes initially setting a browse counter in said first variable to said modification counter, wherein said anchor address references a first element of a plurality of elements included in said chain, and wherein said chain is a singly linked list data structure;
initially setting a current element of said chain as said first element;

determining, by said computing system, using said first thread, and subsequent to said atomically copying, that said anchor address in said second variable is valid based on a predefined criterion;

setting, by said computing system, using said first thread, and subsequent to said determining that said anchor address is valid, said second variable to a next address included in said current element of said chain, wherein said next address references a next element of said chain;

incrementing, by said computing system, using said first thread, and subsequent to said determining that said anchor address is valid, said browse counter stored in said first variable;

comparing, by said computing system and subsequent to said incrementing, said browse counter stored in said first variable to a current value of said modification counter, wherein said current value of said modification counter indicates any modification made to said chain by said second thread;

updating said current element to be said next element;

updating, subsequent to said updating said current element, said next element to be an element of said plurality of elements that is referenced by an address included in said current element;

repeating said setting, said incrementing, said comparing, said updating said current element, and said updating said next element until a result of said comparing is that said browse counter is less than or equal to said current value of said modification counter;

determining, by said computing system and in response to said comparing, that said browse counter is less than or equal to said current value of said modification counter;

determining, by said computing system and in response to said determining that said browse counter is less than or equal to said current value of said modification counter, that said scan of said chain is invalid; and storing, in response to said determining that said scan is invalid, an indication that said scan is invalid, wherein said storing is performed in a first computer data storage unit coupled to said computing system or in a second computer data storage unit coupled to another computing system.

16. The method of claim 15, further comprising displaying, in response to said determining that said scan is invalid, said indication that said scan is invalid, wherein said displaying is performed at a first display device coupled to said computing system or at a second display device coupled to another computing system.

17. The method of claim 15, further comprising re-scanning said chain, wherein said re-scanning includes performing a second scan of said chain starting at an element referenced by said anchor address.

18. The method of claim 15, further comprising removing, using said second thread, said first element from said chain, wherein said removing is performed concurrently with at least one action performed by said first thread.

19. The method of claim 15, further comprising adding, using said second thread, an element as a new first element of said chain, wherein said adding is performed concurrently with at least one action performed by said first thread.

* * * * *